(12) United States Patent
Yamaguchi et al.

(10) Patent No.: US 11,509,077 B2
(45) Date of Patent: Nov. 22, 2022

(54) COVER

(71) Applicant: Yazaki Corporation, Tokyo (JP)

(72) Inventors: Makoto Yamaguchi, Shizuoka (JP); Ryu Okada, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 145 days.

(21) Appl. No.: 17/146,976

(22) Filed: Jan. 12, 2021

(65) Prior Publication Data
US 2021/0226359 A1 Jul. 22, 2021

(30) Foreign Application Priority Data

Jan. 16, 2020 (JP) .............. JP2020-004899

(51) Int. Cl.
H01R 11/28 (2006.01)

(52) U.S. Cl.
CPC ......... *H01R 11/284* (2013.01); *H01R 11/282* (2013.01)

(58) Field of Classification Search
CPC .............. H01R 11/284; H01R 11/282; H01H 2085/025; H01H 85/25; H01H 85/2045
See application file for complete search history.

(56) References Cited

U.S. PATENT DOCUMENTS 5,382,755 A * 1/1995 Correnti .............. H01R 13/447
174/67
5,918,763 A * 7/1999 Hara .................. E05C 19/06
220/784

FOREIGN PATENT DOCUMENTS

| EP | 3070730 | * | 9/2016 |
| JP | 52-30029 U | | 3/1977 |
| JP | 64-41177 U | | 3/1989 |
| JP | 5-344629 A | | 12/1993 |
| JP | 6-17325 U | | 3/1994 |
| JP | 7-9020 U | | 2/1995 |
| JP | 7-50826 Y2 | | 11/1995 |
| JP | 9-246746 A | | 9/1997 |
| JP | 10-108338 A | | 4/1998 |
| JP | 2011-229302 A | | 11/2011 |

* cited by examiner

Primary Examiner — Jean F Duverne
(74) Attorney, Agent, or Firm — Sughrue Mion, PLLC

(57) ABSTRACT

A cover includes a top wall, a first side wall, a second side wall facing the first side wall, and a lock releasing portion. The first side wall includes a locking portion engageable with a locked portion of a covered body. The second side wall includes an opposed locking portion engageable with an opposed locked portion of the covered body. The lock releasing portion includes: a release operation portion inclined and projecting from the top wall in a cover mounting direction; and a connecting portion connecting the release operation portion with the first side wall around the locking portion or the release operation portion with the locking portion.

5 Claims, 9 Drawing Sheets

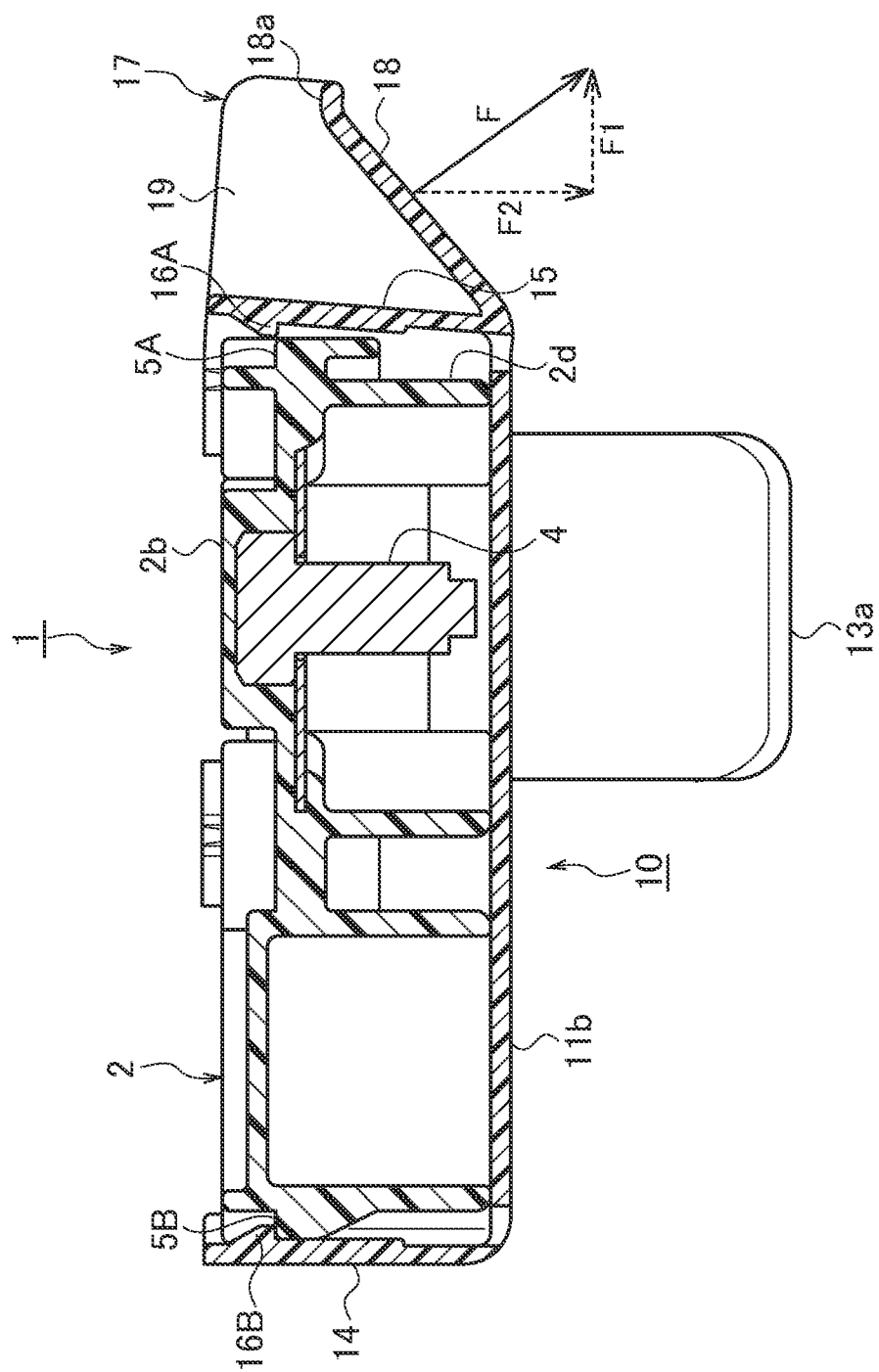

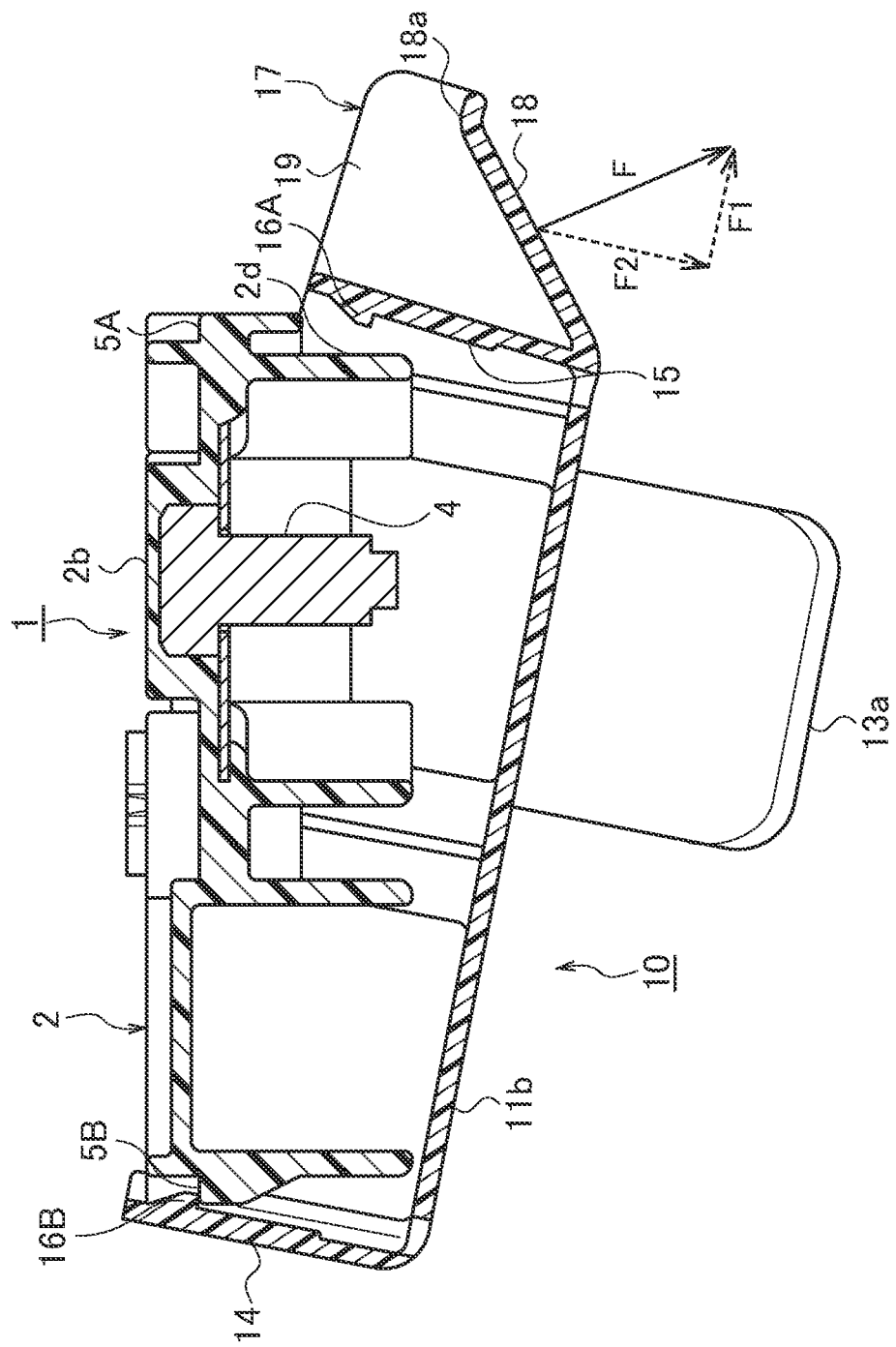

COVER

CROSS-REFERENCE TO RELATED APPLICATIONS

The present application is based on, and claims priority from Japanese Patent Application No. 2020-004899, filed on Jan. 16, 2020, the entire contents of which are incorporated herein by reference.

TECHNICAL FIELD

The disclosure relates to a cover detachably attached to a covered body such as a fuse unit.

BACKGROUND

For example, a cover for an electric junction box is disclosed in Patent Document 1 (JP H10-108338 A). The cover of Patent Document 1 includes a waterproof wall externally fitted so as to cover a cover mounting surface of a fuse box as an electric connection box, a flexible locking piece capable of engaging with and disengaging from an engaging projection projected on the cover mounting surface, and a finger hooking projection for deflecting the flexible locking piece to release the engagement with the engaging projection.

Then, a finger is hooked on the finger hooking projection and pulled upward to turn the flexible locking piece, the whole of the flexible locking piece, the waterproof wall, and the finger hooking projection is rotated from the base end of the flexible locking piece, so that the engagement state of the flexible locking piece with the engaging projection is released and the cover can be removed from the fuse box.

SUMMARY

However, in the cover of Patent Document 1, when a force is applied only in the upward direction to the finger hooking projection, the whole of the flexible locking piece, the waterproof wall, and the finger hooking projection do not rotate from the base end of the flexible locking piece, so that the engagement state between the flexible locking piece and the engaging projection may not be released.

The present application has been made in view of the problems of the background. It is an object of the present application to provide a cover capable of easily releasing the locked state at the time of an intended release operation while maintaining the holding force in the locked state at a normal time.

A cover according to an embodiment includes a top wall, a first side wall, a second side wall facing the first side wall, and a lock releasing portion. The first side wall includes a locking portion engageable with a locked portion of a covered body. The second side wall includes an opposed locking portion engageable with an opposed locked portion of the covered body, and The lock releasing portion includes: a release operation portion projecting from the top wall in a direction of mounting the cover; and a connecting portion connecting the release operation portion with the first side wall around the locking portion, or the release operation portion with the locking portion.

The opposed locking portion may be provided on a same straight line connecting the lock releasing portion and the locking portion when viewed from a cover attaching/detaching direction.

The covered body may be fixed to an equipment, and the lock releasing portion may be disposed so as to protrude from the equipment when viewed from a cover attaching/detaching direction.

The release operation portion may be a finger abutting portion, and a tip end of the finger abutting portion may have a substantially circular arc shape.

The covered body may be a fuse unit having a fuse, and an upper surface and a side surface of the fuse unit may be covered with the top wall, the first side wall, and the second side wall.

According to the embodiment, it is possible to provide the cover capable of easily releasing the locked state at the time of an intended release operation while maintaining the holding force in the locked state at a normal time.

BRIEF DESCRIPTION OF THE DRAWING

FIG. 6 is a cross-sectional view taken along the V-V line of FIG. 4 in a state immediately before the cover according to the embodiment is removed.

FIG. 7 is a cross-sectional view taken along the V-V line of FIG. 4 in a state in which the cover according to the embodiment is being removed.

DETAILED DESCRIPTION

Hereinafter, a cover according to an embodiment will be described in detail with reference to the drawings.

Figure 1:
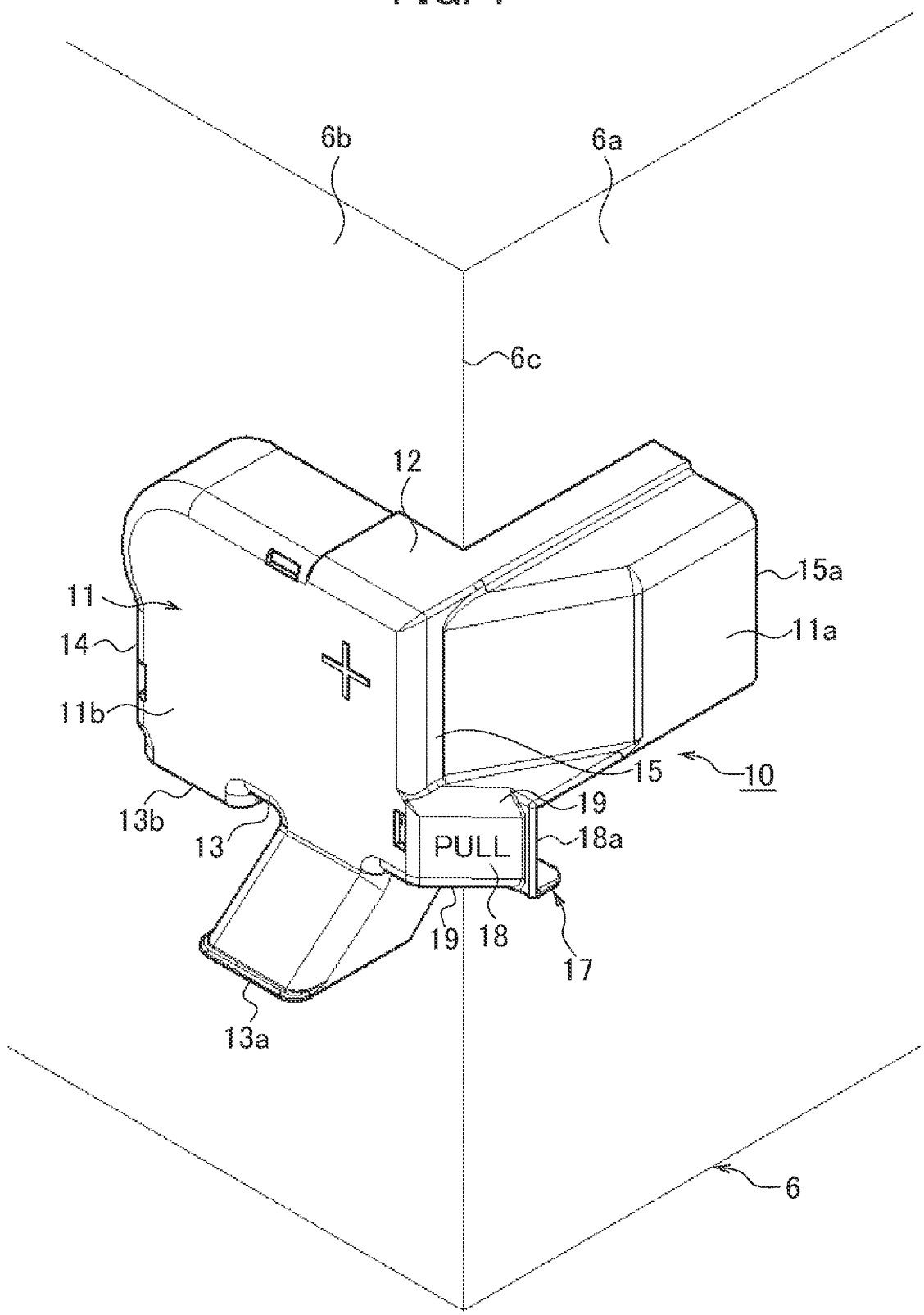
FIG. 1 is a perspective view illustrating an example of a cover according to an embodiment.
Figure 2:
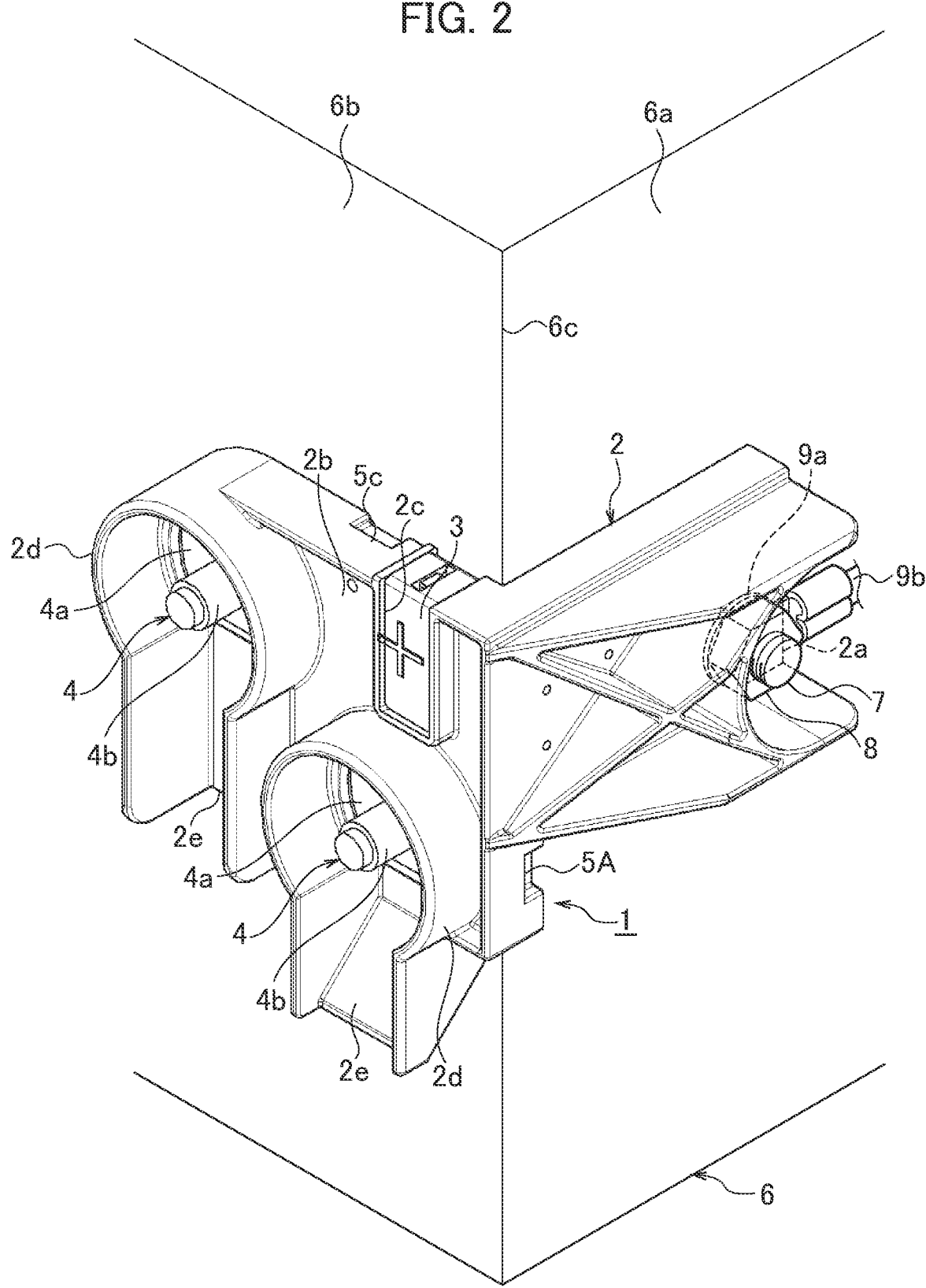
FIG. 2 is a perspective view illustrating an assembly state of a fuse unit in which the cover according to the embodiment is removed.
Figure 3:
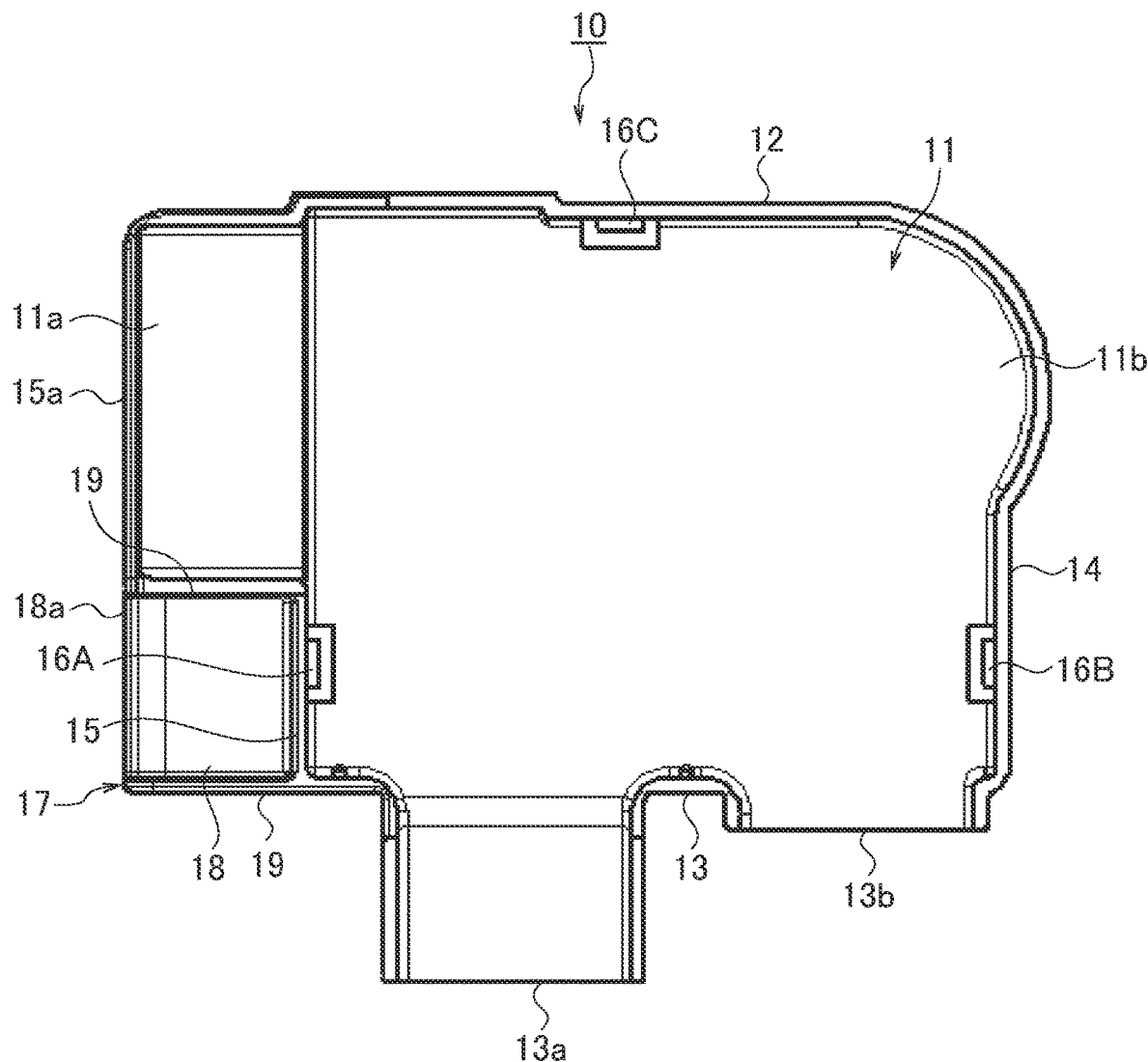
FIG. 3 is a rear view of the cover according to the embodiment.
Figure 4:
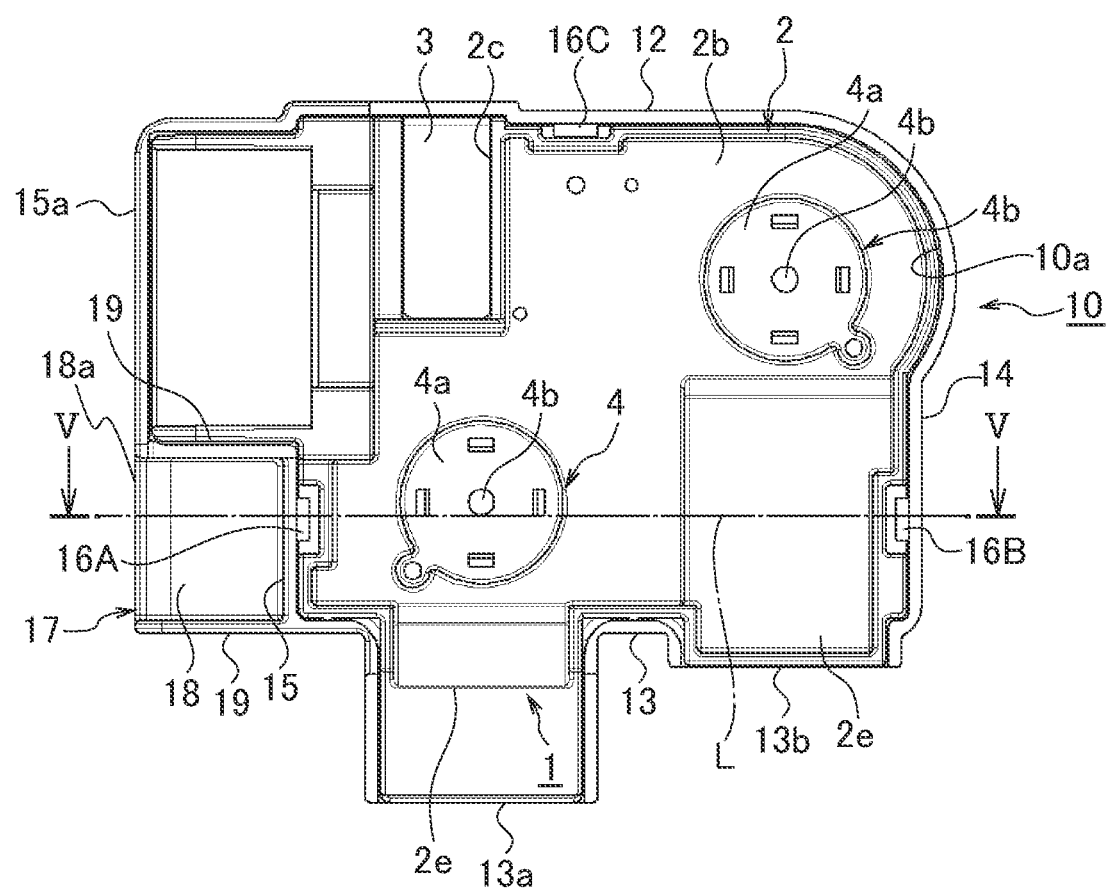
FIG. 4 is a rear view of the cover according to the embodiment and the fuse unit in an assembled state.
Figure 5:
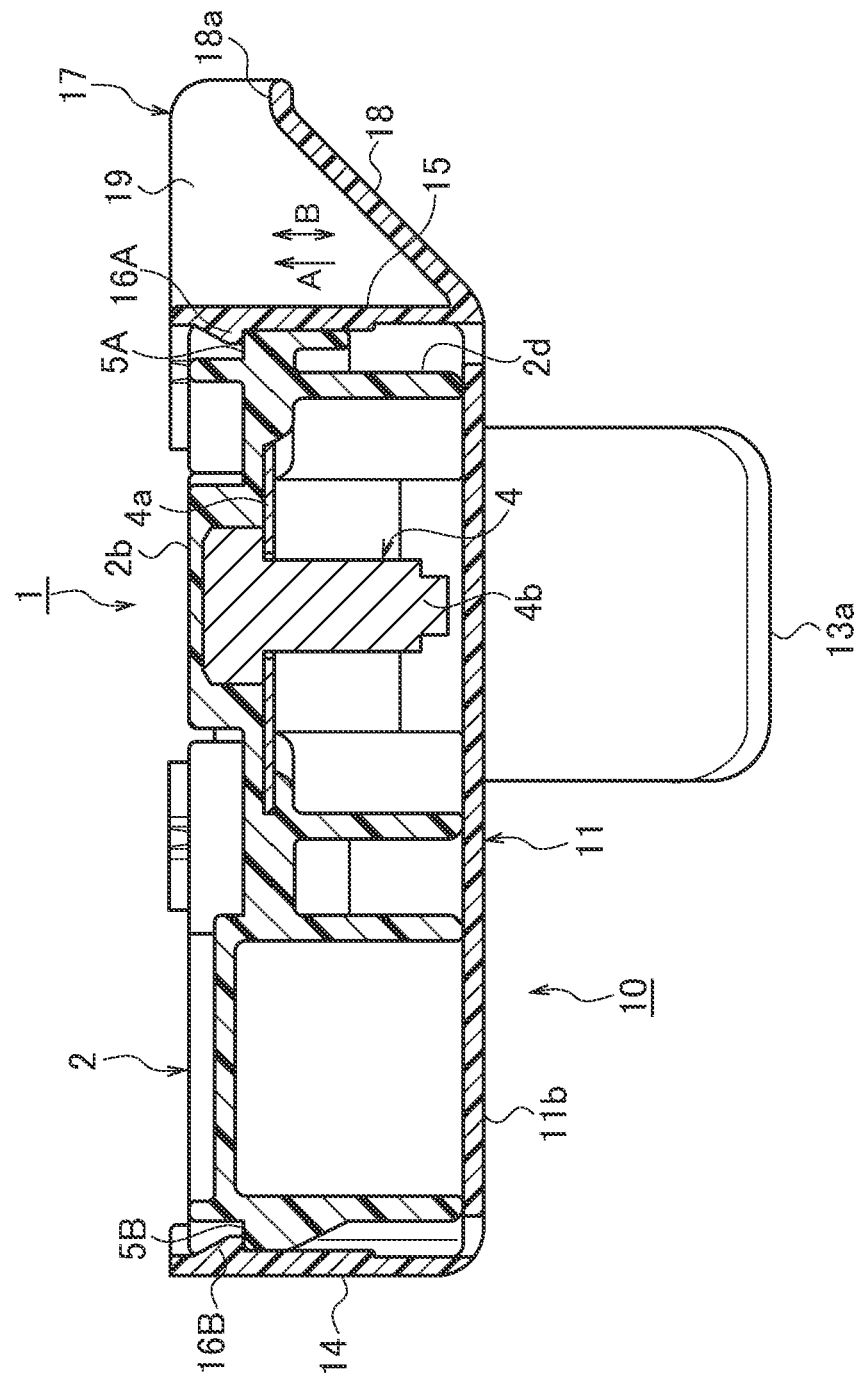
FIG. 5 is a cross-sectional view taken along the V-V line of FIG. 4.
Figure 8A:
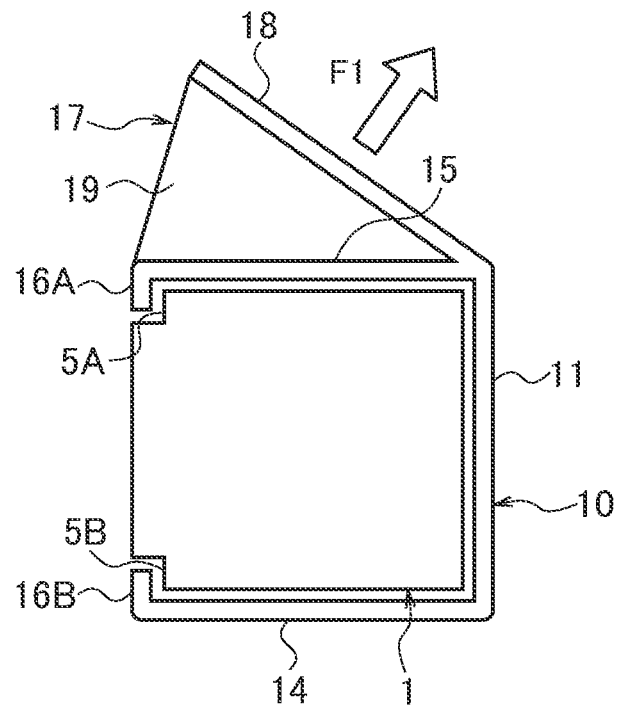
FIG. 8A is a schematic explanatory view illustrating the state immediately before the cover according to the embodiment is removed.
Figure 8B:
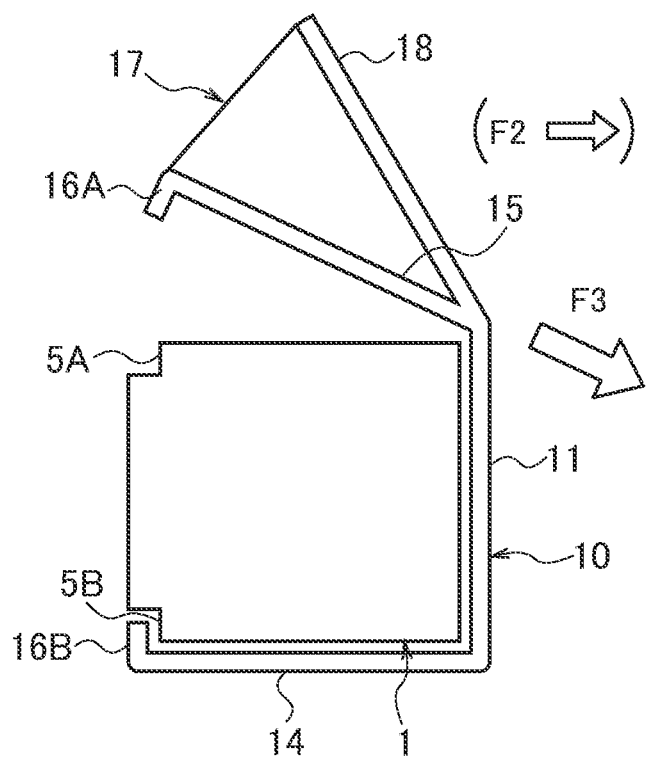
FIG. 8B is a schematic explanatory view illustrating the state in which the cover according to the embodiment is being removed.
Figure 9A:
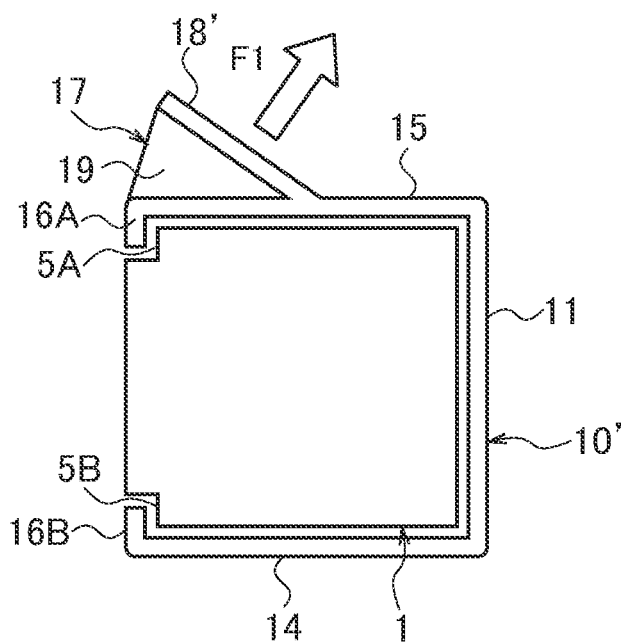
FIG. 9A is a schematic explanatory view illustrating a state immediately before a cover of a reference example is removed.
Figure 9B:
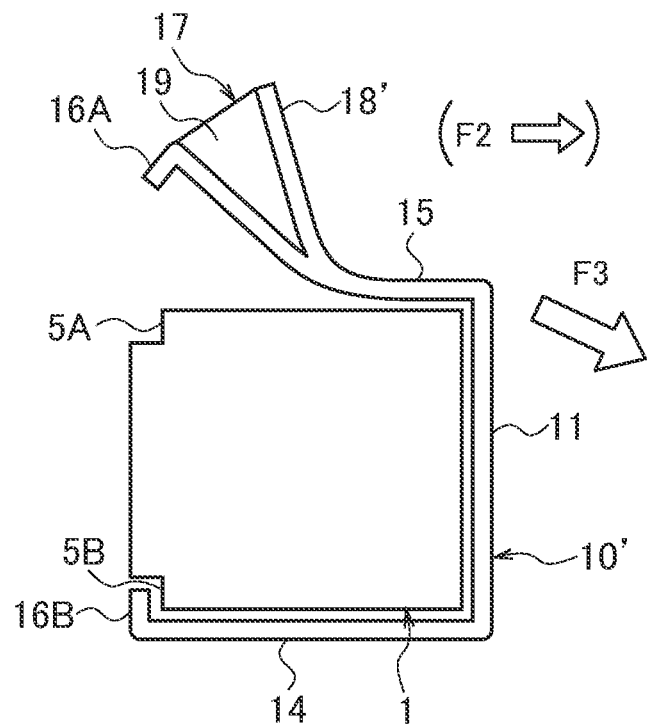
FIG. 9B is a schematic explanatory diagram illustrating a state in which the cover of the reference example is being removed.

FIG. 1 is a perspective view illustrating an example of a cover according to an embodiment. FIG. 2 is a perspective view illustrating an assembly state of a fuse unit in which the cover according to the embodiment is removed. FIG. 3 is a rear view of the cover according to the embodiment. FIG. 4 is a rear view of the cover according to the embodiment and the fuse unit in an assembled state. FIG. 5 is a cross-sectional view taken along the V-V line of FIG. 4. FIG. 6 is a cross-sectional view taken along the V-V line of FIG. 4 in a state immediately before the cover according to the embodiment is removed. FIG. 7 is a sectional view taken along the line V-V of FIG. 4 in a state in which the cover according to the embodiment is being removed. FIG. 8A is a schematic explanatory view illustrating the state immediately before the cover according to the embodiment is removed. FIG. 8B is a schematic explanatory view illustrating the state in which the cover according to the embodiment is being removed. FIG. 9A is a schematic explanatory view illustrating a state immediately before a cover of a reference example is removed. FIG. 9B is a schematic explanatory diagram illustrating a state in which the cover of the reference example is being removed.

As illustrated in FIGS. 1 and 3 to 5, the cover 10 includes a top wall 11, an upper side wall 12, a lower side wall 13, a right side wall (first side wall) 15, a left side wall (second side wall) 14, and a lock releasing portion 17. An opening 10a on the lower surface of the cover 10 is configured to cover the fuse unit (covered body) 1. As illustrated in FIG. 2, the fuse unit 1 is connected to a stud bolt (a battery post of a positive electrode) 7 protruding from the first surface 6a of a battery (equipment) 6.

The fuse unit 1 is used for connecting the battery 6 and a plurality of electric wires (not illustrated) for supplying power. As illustrated in FIGS. 2, 4, and 5, the fuse unit 1 includes a synthetic resin L-shaped unit body 2 attached to a corner portion 6c formed by a first surface 6a and a second surface 6b of the battery 6. In a first fixing portion (electric wire connection portion) 2a of the unit body 2 abutting on the first surface 6a of the battery 6, a round hole (not illustrated) through which the stud bolt 7 is inserted is formed. A terminal 9a with an electric wire 9b is fixed to the stud bolt 7 through a nut 8. That is, the first fixing portion 2a fixes the unit body 2 and the electric wire 9b to the battery 6, and electrically connects the battery 6, the electric wire 9b, and the unit body 2.

As illustrated in FIGS. 2 and 5, a rectangular recessed fuse housing portion 2c for housing a fuse 3 and a pair of housing portions 2d for housing a pair of electric connection portions 4 are formed in a second fixing portion (connecting portion) 2b of the unit body 2 abutting on a second surface 6a of a battery 6. The pair of housing portions 2d are formed in an arcuate frame shape to cover the pair of electric connection portions 4, and have electric wire lead-out ports 2e for leading out a pair of electric wires (not illustrated) for supplying power connected to the pair of electric connection portions 4. Each electric connection portion 4 includes a disk portion 4a which is insert-molded into the second fixing portion 2b, and a cylindrical portion 4b which protrudes from the center of the disk portion 4a.

As illustrated in FIGS. 1, 3, and 5, the top wall 11 includes a first top wall portion 11a covering an upper surface of the first fixing portion 2a, and a second top wall portion 11b covering the second fixing portion 2b. The cover 10 includes an upper side wall 12 and a lower side wall 13 each having L-shaped plate shape and facing each other in the vertical direction, and a left side wall 14 and a right side wall 15 facing each other in the horizontal direction. A side surface of the unit body 2 is covered with the upper side wall 12, the lower side wall 13, the left side wall 14, and the right side wall 15. The right side wall (first side wall) 15 includes a hook-shaped locking portion 16A engageable with a recessed locked portion 5A provided on the fuse unit 1. The left side wall (second side wall) 14 includes a hook-shaped opposed locking portion 16B engageable with a recessed opposed locked portion 5B provided on the fuse unit 1. As illustrated in FIGS. 4 and 5, the opposed locking portion 16B is provided on a same straight line L connecting the lock releasing portion 17 and the locking portion 16A as viewed from a cover attaching/detaching direction B. As illustrated in FIG. 1, a pair of wire lead-out ports 13a, 13b are formed on the lower side wall 13. An electric wire outlet 15a is also formed in the right side wall 15. As illustrated in FIGS. 2 and 4, at the center of the upper side wall 12, a hook-shaped auxiliary locking portion 16C engageable with a recessed auxiliary locked portion 5c provided on the fuse unit 1 is provided.

As illustrated in FIGS. 1 and 3 to 5, the lock releasing portion 17 includes a finger abutting portion (release operation portion) 18 protruding from the second top wall portion 11b while being inclined in a cover mounting direction A, and a connecting portion 19 connecting the finger abutting portion 18 with the right side wall 15 around the locking portion 16A. The lock releasing portion 17 is disposed so as to project from the battery 6 when viewed from the cover attaching/detaching direction B. That is, the lock releasing portion 17 is arranged at the corner portion 6b of the battery 6 to which the fuse unit 1 is connected. A tip end 18a of the finger abutting portion 18 has a substantially circular arc shape. The connecting portion 19 may be configured to connect the finger abutting portion 18 with the locking portion 16A.

With the cover 10 according to the embodiment, as illustrated in FIG. 6, even if a stress (lock releasing force F) is applied to the lock releasing portion 17, the stress does not escape because the locking portion 16A and the opposed locking portion 16B are arranged to face each other. Thus, the stress decomposed into the lock releasing load F1 acts on the locking portion 16A immediately adjacent to the lock releasing portion 17, so that the locking portion 16A of the cover 10 is separated from the locked portion 5A of the fuse unit 1.

Continuously, as illustrated in FIG. 7, when the lock releasing force F is maintained with respect to the lock releasing portion 17, the opposed locking portion 16B serves as a fulcrum, and a force in the rotational direction (cover releasing load F2) acts on the cover 10, and the cover 10 is detached from the fuse unit 1. As illustrated in FIG. 5, the lock releasing portion 17 includes a finger abutting portion 18 that is inclined and protrudes from the top wall 11 in the cover mounting direction A. The lock releasing portion 17 is connected to the right side wall 15. Since the finger abutting portion 18 is inclined, a force (lock releasing force F) acts in the direction in which the lock releasing portion 17 rotates with the opposed locking portion 16B as a fulcrum, and the cover 10 can be detached from the fuse unit 1 by one behavior. As described above, the cover 10 according to the embodiment can be easily released comparison with the cover of the conventional example at the time of an intended release operation, that is, when stress is applied to the lock releasing portion 17, while the holding force in the locked state equivalent to that of the cover of the conventional example is maintained in the normal state.

Further, since the finger abutting portion 18 is connected to the top wall 11, even when the cover 10 is made of resin which is not a rigid body, the cover 10 can be removed from the fuse unit 1 with an efficient force. That is, as illustrated in FIGS. 8A and 8B, a force is applied to the direction F1 at the beginning of the work, and the lock is released, but the direction F2 for removing the cover 10, the direction F3 for releasing the opposed lock portion 16B, and the direction of the force are changed in this order, and the cover 10 is removed in such a manner as to rotate. That is, in the stage where the force is applied in the direction F2 and the direction F3, as illustrated in FIG. 8B, since the side wall 15 having the lock releasing portion 17 is inclined outward, the side wall 15 on the top wall 11 side does not abut the fuse unit 1. Therefore, the cover 10 can be easily detached from the fuse unit 1.

However, as illustrated in a reference example of FIGS. 9A and 9B, when a cover 10' of the reference example is not a rigid body and a finger abutting portion 18' is connected to the side wall 15, when a force is applied to the finger abutting portion 18', the side wall 15 between the finger abutting portion 18' and the top wall 11 does not tilt outward. Therefore, there is a possibility that the side wall 15 is accumulated at a position along the fuse unit 1. In the stage of applying force in the direction F2 and the direction F3, the side wall 15 accumulated along the fuse unit 1 abuts on the side surface of the fuse unit 1 (sliding contact), so that the force is dispersed.

As illustrated in FIGS. 4 and 5, since the locking portion 16A, the opposed locking portion 16B, and the lock releasing portion 17 are arranged on the same straight line L, the lock releasing portion 17 does not twist the cover 10 during the lock releasing operation, thereby facilitating the removal operation of the cover 10.

Further, as illustrated in FIG. 1, since the lock releasing portion 17 is arranged at the corner portion 6c of the battery 6 to which the fuse unit 1 is connected, a gap for the operator to insert his/her finger into the finger abutting portion 18 can be sufficiently secured without being blocked by the battery 6, so that the operator can easily insert his/her finger. In addition, even when the length of the side wall 15 is small, the finger abutting portion 18 having an area sufficient for touching the finger can be provided.

Further, as illustrated in FIG. 1, the operator can easily understand the operation method by the marking (PULL), and can suppress the breakage of the cover 10 and the fuse unit 1 due to the erroneous separation method.

Although the embodiments have been described above, the embodiments are not limited thereto, and various modifications can be made within the scope of the gist of the present embodiment.

That is, according to the embodiment, the battery is described as the equipment to which the fuse unit is connected, but the equipment may be a voltage converter or the like.

Further, according to the embodiment, the electric wire for supplying power is connected to the fuse unit through the electric connection portion, but the electric wire for supplying power may be connected to the fuse unit through a connector.

What is claimed is:

1. A cover for covering a covered body, the covered body including
   a synthetic resin L-shaped unit body attachable to a corner portion formed by a first surface and a second surface of a battery,
   a first fixing portion of the unit body abutting on the first surface, and
   a second fixing portion of the unit body abutting on the second surface of the battery;
   the cover, comprising:
      a top wall configured to cover the covered body, the top wall including a first top wall portion covering an upper surface of the first fixing portion, and a second top wall portion covering the second fixing portion;
      a first side wall connected to one end of the second top wall portion;
      a second side wall facing the first side wall connected to other end of the second top wall portion and facing the first side wall; and
      a lock releasing portion, wherein
   the first side wall comprises a locking portion engageable with a locked portion of a covered body,
   the second side wall comprises an opposed locking portion engageable with an opposed locked portion of the covered body, and
   the lock releasing portion comprises: a release operation portion inclined and projecting outward from a connected portion of the second top wall portion and the first side wall in a cover mounting direction; and a connecting portion connecting the release operation portion with the first side wall around the locking portion, or the release operation portion with the locking portion.

2. The cover of claim 1, wherein
the opposed locking portion is provided on a same straight line connecting the lock releasing portion and the locking portion when viewed from a cover attaching/detaching direction.

3. The cover of claim 1, wherein
the covered body is fixed to an equipment, and
the lock releasing portion is disposed so as to protrude from the equipment when viewed from a cover attaching/detaching direction.

4. The cover of claim 1, wherein
the release operation portion is a finger abutting portion, and a tip end of the finger abutting portion has a substantially circular arc shape.

5. The cover of claim 1, wherein
the covered body is a fuse unit having a fuse, and
an upper surface and a side surface of the fuse unit are covered with the top wall, the first side wall, and the second side wall.

* * * * *